(12) United States Patent
Gallouzi et al.

(10) Patent No.: US 9,274,556 B2
(45) Date of Patent: Mar. 1, 2016

(54) TABLET COMPUTER STAND

(75) Inventors: Souheil Gallouzi, San Diego, CA (US); William Benjamin Hasbrook, Tualatin, OR (US); Sean Michael Stuck, Portland, OR (US); William Westwood, Escondido, CA (US)

(73) Assignee: MOPHIE, INC., Santa Ana, CA (US)

( * ) Notice: Subject to any disclaimer, the term of this patent is extended or adjusted under 35 U.S.C. 154(b) by 436 days.

(21) Appl. No.: 13/344,507

(22) Filed: Jan. 5, 2012

(65) Prior Publication Data

US 2012/0170212 A1 Jul. 5, 2012

Related U.S. Application Data

(60) Provisional application No. 61/429,859, filed on Jan. 5, 2011.

(51) Int. Cl.
| | |
|---|---|
| *G06F 1/16* | (2006.01) |
| *F16M 11/04* | (2006.01) |
| *F16M 11/10* | (2006.01) |
| *F16M 11/20* | (2006.01) |

(Continued)

(52) U.S. Cl.
CPC ........... *G06F 1/1632* (2013.01); *F16M 11/041* (2013.01); *F16M 11/105* (2013.01); *F16M 11/2021* (2013.01); *F16M 11/38* (2013.01); *F16M 13/00* (2013.01); *G06F 1/1626* (2013.01)

(58) Field of Classification Search
CPC ... G06F 1/1626; G06F 1/1616; G06F 1/1613; G06F 1/1654; G06F 2200/1634; G06F 1/1601; G06F 1/1637; G06F 1/1641; G06F 1/1647; G06F 1/1632; H05K 5/02; H05K 5/0204; H05K 5/03; H05K 7/00; F16M 11/041; F16M 11/105; F16M 11/38; F16M 11/2021; F16M 13/00; F16M 1/1626
USPC ............. 361/679.55, 679.01, 679.02, 679.21, 361/679.26, 679.27, 679.56–679.59, 361/679.41; 312/223.1–223.2; 248/917–924; 710/303–305

See application file for complete search history.

(56) References Cited

U.S. PATENT DOCUMENTS

| | | |
|---|---|---|
| D277,662 S | 2/1985 | Huntington et al. |
| 5,039,929 A | 8/1991 | Veistroffer et al. |

(Continued)

FOREIGN PATENT DOCUMENTS

| | | |
|---|---|---|
| DM | 061043 | 8/2012 |
| JP | 1379870 | 1/2010 |

(Continued)

OTHER PUBLICATIONS

Notification of Transmittal of the International Search Report and the Written Opinion of the International Search Authority, or the Declaration dated May 29, 2012 for PCT/US2012/20370 based on shared parent U.S. Appl. No. 61/429,859.

(Continued)

*Primary Examiner* — Anthony Haughton
*Assistant Examiner* — Ingrid Wright
(74) *Attorney, Agent, or Firm* — Knobbe, Martens, Olson & Bear, LLP (57) ABSTRACT

A tablet computer stand configured to hold a tablet computer in either horizontal (landscape) or vertical (portrait) positions. Tablet computer stand may comprise a T-shaped tablet computer dock (the "T-Arm"), a dock rotator, a neck, and a U-shaped base (the "U-Foot").

24 Claims, 11 Drawing Sheets

(51) Int. Cl.
*F16M 11/38* (2006.01)
*F16M 13/00* (2006.01)

(56) References Cited

U.S. PATENT DOCUMENTS

| | | | |
|---|---|---|---|
| D345,728 S | 4/1994 | Tyneski et al. | |
| D350,540 S | 9/1994 | Hyvonen | |
| D361,069 S | 8/1995 | Hellier et al. | |
| D369,344 S | 4/1996 | Lindeman et al. | |
| D411,544 S | 6/1999 | Richter | |
| D413,097 S | 8/1999 | Chang | |
| 5,946,637 A | 8/1999 | Umbach et al. | |
| D413,607 S | 9/1999 | Lindahl | |
| D442,939 S | 5/2001 | Goldenburg | |
| D458,266 S | 6/2002 | Herath | |
| D460,446 S | 7/2002 | Hughes et al. | |
| D463,361 S | 9/2002 | Ruohonen | |
| D501,205 S | 1/2005 | Quinn | |
| D520,447 S | 5/2006 | Liu | |
| D533,499 S | 12/2006 | Suzuki | |
| D535,614 S | 1/2007 | Majanen et al. | |
| 7,158,092 B2 | 1/2007 | Shen | |
| D566,590 S | 4/2008 | Stevens et al. | |
| D585,897 S | 2/2009 | Carnevali | |
| 7,492,579 B2 * | 2/2009 | Homer et al. | 361/679.41 |
| 7,493,177 B2 | 2/2009 | Ledbetter et al. | |
| D592,188 S | 5/2009 | Huang | |
| 7,532,466 B2 | 5/2009 | Kobayashi et al. | |
| 7,542,052 B2 * | 6/2009 | Solomon et al. | 345/659 |
| D602,913 S | 10/2009 | Han et al. | |
| D605,588 S | 12/2009 | Nomi et al. | |
| D608,350 S | 1/2010 | Bo | |
| D614,613 S | 4/2010 | Kim et al. | |
| D620,931 S | 8/2010 | Opman | |
| D623,132 S | 9/2010 | Yano | |
| D623,638 S | 9/2010 | Richardson et al. | |
| D623,639 S | 9/2010 | Richardson et al. | |
| D625,729 S | 10/2010 | McNames et al. | |
| D626,439 S | 11/2010 | Lee et al. | |
| D626,541 S | 11/2010 | Kim et al. | |
| D626,964 S | 11/2010 | Richardson et al. | |
| D629,315 S | 12/2010 | McAlpine et al. | |
| D629,355 S | 12/2010 | Bodley et al. | |
| D634,304 S | 3/2011 | Andre et al. | |
| D638,414 S | 5/2011 | Magness et al. | |
| D639,286 S | 6/2011 | Mohoney | |
| D639,816 S | 6/2011 | Bau | |
| D640,707 S | 6/2011 | Yeh | |
| D643,030 S | 8/2011 | Cheng et al. | |
| D643,423 S | 8/2011 | Smith et al. | |
| D643,433 S | 8/2011 | Hsieh et al. | |
| D645,033 S | 9/2011 | Quong et al. | |
| D647,907 S | 11/2011 | Perry et al. | |
| D648,339 S | 11/2011 | O'Neil et al. | |
| D656,930 S | 4/2012 | Son | |
| D657,741 S | 4/2012 | Fahrendorff et al. | |
| D660,794 S | 5/2012 | Fahrendorff et al. | |
| D662,470 S | 6/2012 | Smith et al. | |
| 8,240,628 B2 * | 8/2012 | Huang | 248/316.1 |
| 8,265,319 B2 | 9/2012 | Groset et al. | |
| 8,295,652 B1 | 10/2012 | Newstead | |
| D670,703 S | 11/2012 | Hasbrook et al. | |
| 8,369,082 B2 * | 2/2013 | Madonna et al. | 361/679.41 |
| D682,780 S | 5/2013 | Brown | |
| D685,321 S | 7/2013 | Smith et al. | |
| D690,707 S | 10/2013 | Minn et al. | |
| D696,241 S | 12/2013 | Paugh et al. | |
| 8,616,327 B1 | 12/2013 | Palacios | |
| 8,724,837 B2 | 5/2014 | Crooijmans et al. | |
| D707,673 S | 6/2014 | Lan | |
| 2006/0221565 A1 * | 10/2006 | Doherty et al. | 361/683 |
| 2008/0157716 A1 | 7/2008 | Jo | |
| 2009/0160399 A1 | 6/2009 | Woud | |
| 2009/0160400 A1 | 6/2009 | Woud | |
| 2010/0062615 A1 | 3/2010 | Prest | |
| 2010/0078343 A1 * | 4/2010 | Hoellwarth et al. | 206/320 |
| 2011/0069445 A1 | 3/2011 | Haren et al. | |
| 2012/0194132 A1 | 8/2012 | Ikegame | |
| 2013/0050933 A1 | 2/2013 | Prest | |
| 2013/0058036 A1 | 3/2013 | Holzer et al. | |
| 2013/0217448 A1 | 8/2013 | Kim et al. | |
| 2013/0241470 A1 | 9/2013 | Kim | |
| 2015/0098184 A1 | 4/2015 | Tsai et al. | |

FOREIGN PATENT DOCUMENTS

| | | |
|---|---|---|
| KR | 20040093848 A * | 11/2004 |
| KR | 30-0629517 | 1/2012 |
| TW | D132908 | 1/2010 |
| WO | WO 2011/139051 A2 | 11/2011 |
| WO | WO 2015/054242 A1 | 4/2015 |

OTHER PUBLICATIONS

U.S. Appl. No. 29/438,896, Including its prosecution history, filed Dec. 4, 2012, Denny Tsai.
U.S. Appl. No. 29/438,221, Including its prosecution history, filed Nov. 27, 2012, Denny Tsai.
U.S. Appl. No. 29/441,683, Including its prosecution history, filed Jan. 8, 2013, Nguyen et al.
U.S. Appl. No. 29/478,241, Including its prosecution history, filed Jan. 2, 2014, Denny Tsai.
U.S. Appl. No. 29/441,684, Including its prosecution history, filed Jan. 8, 2013, Denny Tsai et al.
International Search Report and Written Opinion of the International Searching Authority for PCT/US2012/020370, dated May 29, 2012.
International Preliminary Report on Patentability for PCT/US2012/020370, dated Jul. 10, 2013.
Nick Guy, "RND Power Solutions Sync & Charge Dock with Lightning Connector", dated Nov. 18, 2013, http://www.ilounge.com/index.php/reviews/entry/tylt-energi-sl.
Nick Guy, "RND Power Solutions Sync & Charge Dock with Lightning Connector", dated Nov. 25, 2013, http://www.ilounge.com/index.php/reviews/entry/rnd-power-solutions-sync-charge-dock-with-lightning-connector/.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Altec Lansing Octiv Stage MP450 Review, dated Dec. 8, 2010, http://www.cnet.com/products/altec-lansing-octiv-stage-mp450/.
Mophie Unveils All-Aluminum PowerStand for iPad, dated Jan. 4, 2011, http://www.intomobile.com/2011/01/04/mophie-powerstand-swivels-charges-ipad/.
Mophie PowerStand for iPad (Video), dated Jan. 4, 2011, http://www.gottabemobile.com/2011/01/04/mophie-powerstand-for-ipad-video/.
International Search Report and Written Opinion of the International Searching Authority for PCT/US2014/059483, dated Jan. 15, 2015.

* cited by examiner

TABLET COMPUTER STAND

RELATED APPLICATION

This application claims priority to U.S. Provisional Patent Application No. 61/429,859, entitled TABLET COMPUTER STAND, filed Jan. 5, 2011.

BACKGROUND

1. Field of the Invention

Aspects of the present invention relate in general to a tablet computer stand. Aspects include an apparatus with a modular, foldable design that may be easily adjusted to support smart tablet computers with different form factors.

2. Description of the Related Art

Tablet computers (or simply "tablets") are mobile personal computing devices integrated into a flat touch screen. Most tablet computers primarily use stylus, digital pen or fingertip input along with a virtual onscreen keyboard in lieu of a physical keyboard.

Tablet computers are personal devices well suited for media consumption: accessing the web, viewing photos and videos, playing games, or reading electronic books ("eBooks"), newspapers and magazines.

SUMMARY

Embodiments of the invention include a tablet computer stand configured to hold a tablet computer in a variety of positions.

Tablet computer stand may comprise a T-shaped tablet computer dock (the "T-Arm"), a dock rotator, a neck, and a U-shaped base (the "U-Foot").

DETAILED DESCRIPTION

One aspect of the present invention includes the realization that tablet computers are difficult to hold for a long time. Embodiments of the present invention include a tablet computer stand configured to hold a tablet computer in either horizontal (landscape) or vertical (portrait) positions.

Figure 1:
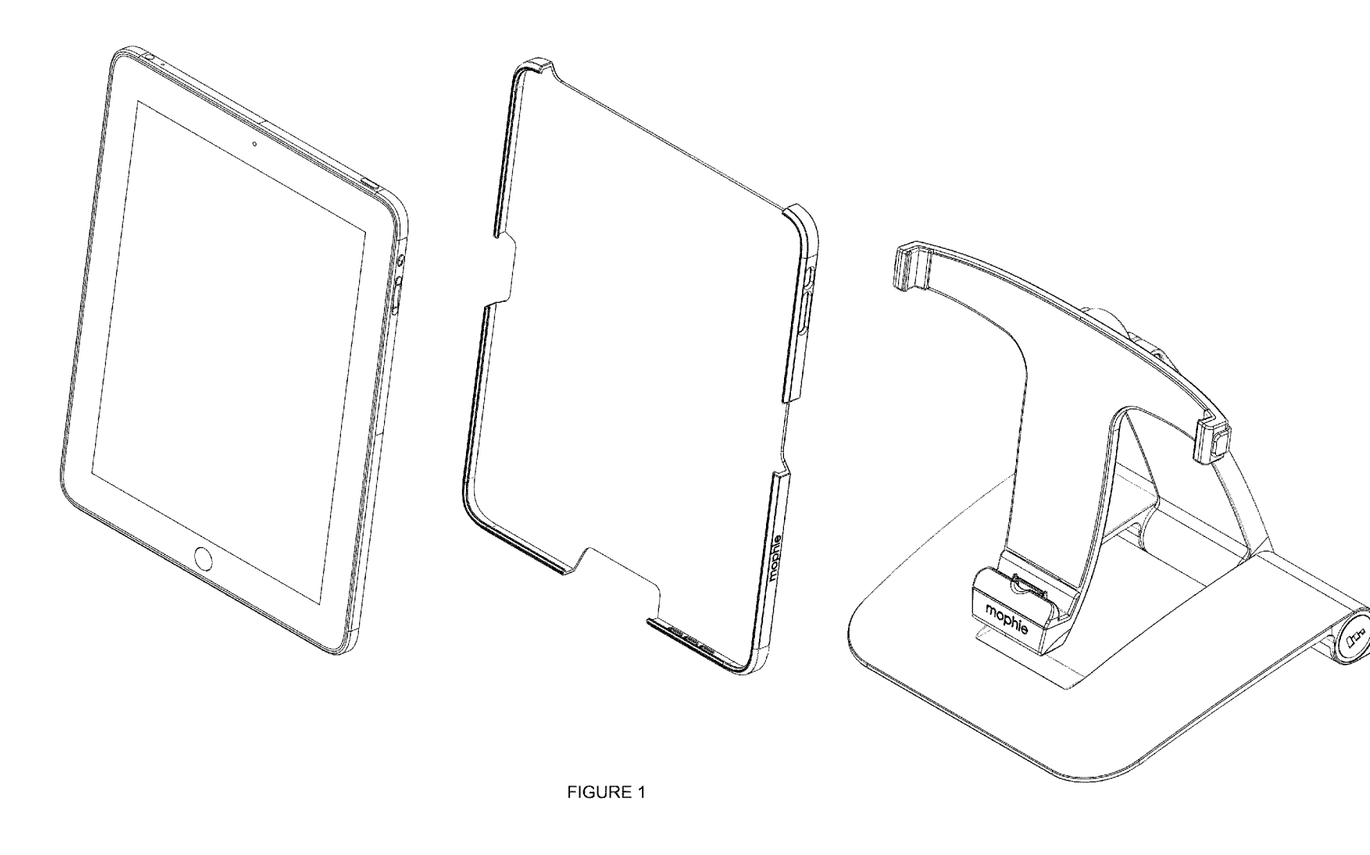
FIG. 1 illustrates three-quarter view of a tablet computer, a tablet computer case, and an embodiment of a tablet computer stand configured to hold the tablet computer in portrait mode.

Turning to FIG. 1 illustrates three-quarter view of a tablet computer, a tablet computer case, and an embodiment of a tablet computer stand configured to hold the tablet computer in portrait mode.

Figure 2A:
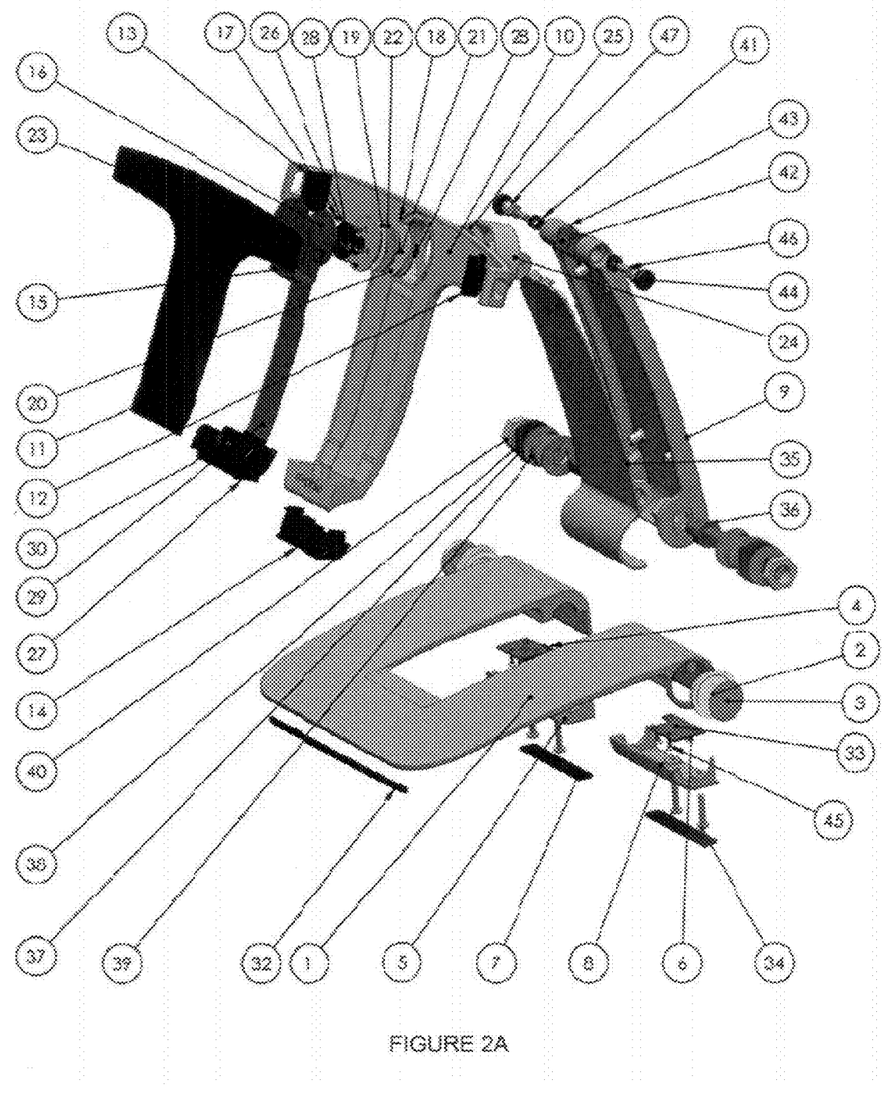
FIG. 2A depicts an exploded three-quarter view of an embodiment of the tablet computer stand.
Figure 2B:
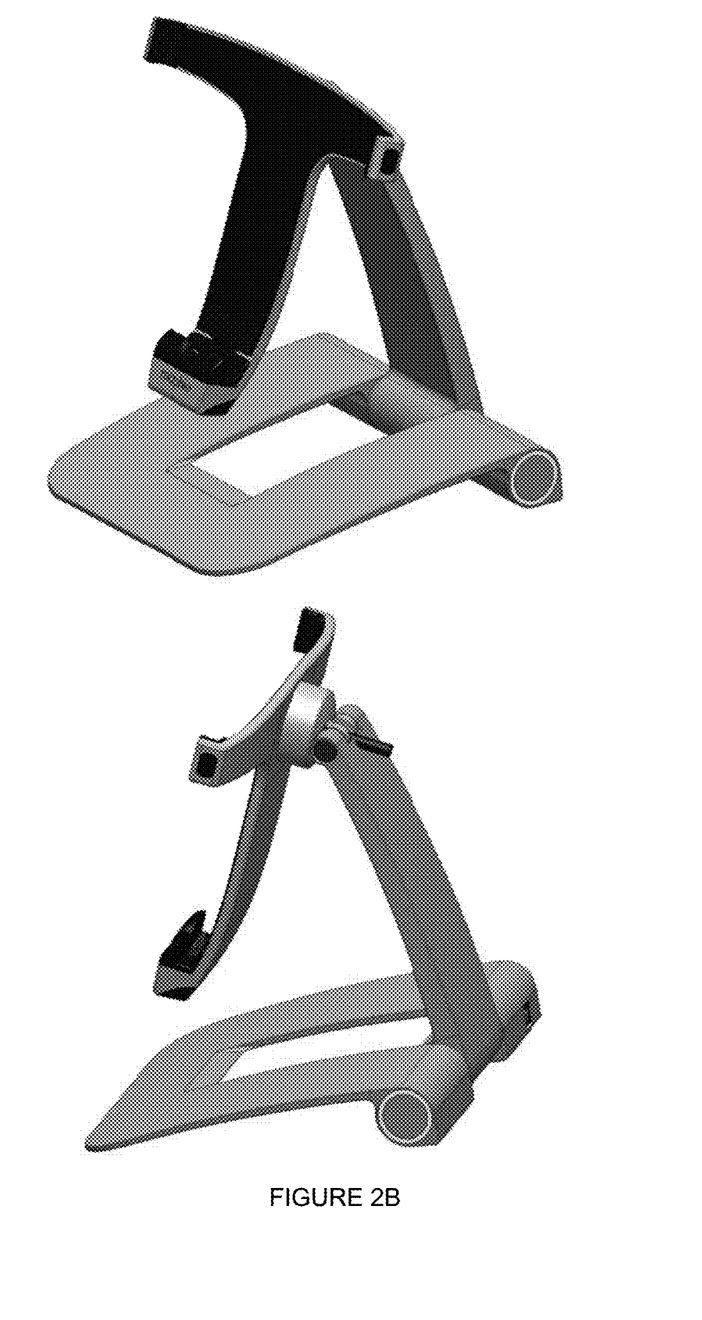
FIG. 2B shows alternate views of an embodiment of the tablet computer stand and a guide to components of the tablet computer stand.

FIG. 2A depicts an exploded three-quarter view of an embodiment of the tablet computer stand, in accordance with an embodiment of the present invention. The exploded view of FIG. 2A allows us to view the various elements of the tablet computer stand. The detailed element parts are listed in FIG. 2B.

At a high level, mechanical components of tablet computer stand include a T-shaped tablet computer dock (the "T-Arm"), a dock rotator, a neck, and a U-shaped base (the "U-Foot").

U-Foot may comprise a metal U-shaped foot 1, an illuminated disk 2, end cap 3, a communications port 4, a metal doors 5 and 7, light emitting diode (LED) 6, and a U-Foot rubber grip 7. U-Foot may additionally comprise a front U-foot rubber grip 32. It is understood that other materials may be used besides rubber to grip the U-Foot with a surface. In some embodiments, U-foot may additionally comprise a cable through bolt 36, locking key 37, friction washer 38, spring washer 39. Communications port 4 enables a tablet computer (plugged into the T-shaped computer dock) to communicate information with a separate personal computer via a ribbon cable 29. It is understood by those known in the art that communications port 4 may be any communications interface adapter, Universal Serial Bus, Thunderbolt, Firewire, or other computer interface as is known in the art. The adapter port 4 may therefore enable communications and electrical power to the tablet computer.

T-shaped computer dock is configured to couple with a tablet computer. Accordingly, the dimensions of T-shaped computer dock may vary depending upon the tablet computer. The T-shaped computer dock be made of a metal armature 10. Metal armature 10 may also coupled to a dock cover 11, a grip 12, a dock T-arm grip 13, a dock T-arm base grip 14, an insert 15, and a rotator 16, a screw 17, grip top 27, rotator cable sleeve 28, a cover case 35 and a tablet computer adapter/ribbon cable 29 to communicate information from the tablet computer. In some embodiments, ribbon cable may be a 30-pin ribbon; in other embodiments, cable 29 may be any other electrical or optical cable known in the art.

The dock rotator enables the T-shaped computer dock to rotate with respect to the arm. Dock rotator may comprise a rotator pivot plate 18, a ball bearing plate 20, ball bearings 21, ball bearing lock plate 22, a washer plate 23, body 24, and slide washer 26.

Neck may comprise a spring washer 41, a friction washer 42, locking key 43, hinge cap 44, rotation pin 46, and screws 45 and 47. Neck may also contain a ribbon cable coupling the adapter/ribbon cable 29, to USB port 4.

Figure 3A:
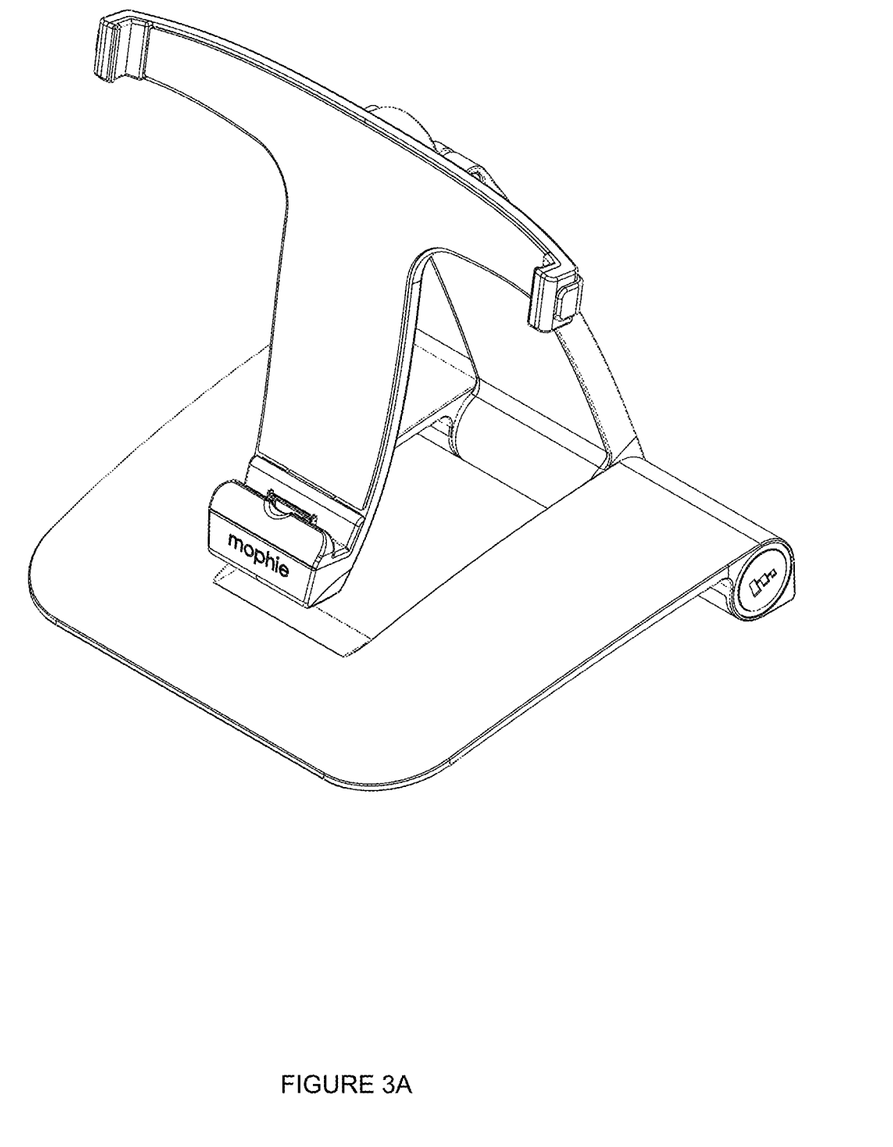
FIG. 3A illustrates an embodiment of the tablet computer stand configured to hold the tablet computer in portrait mode.
Figure 3B:
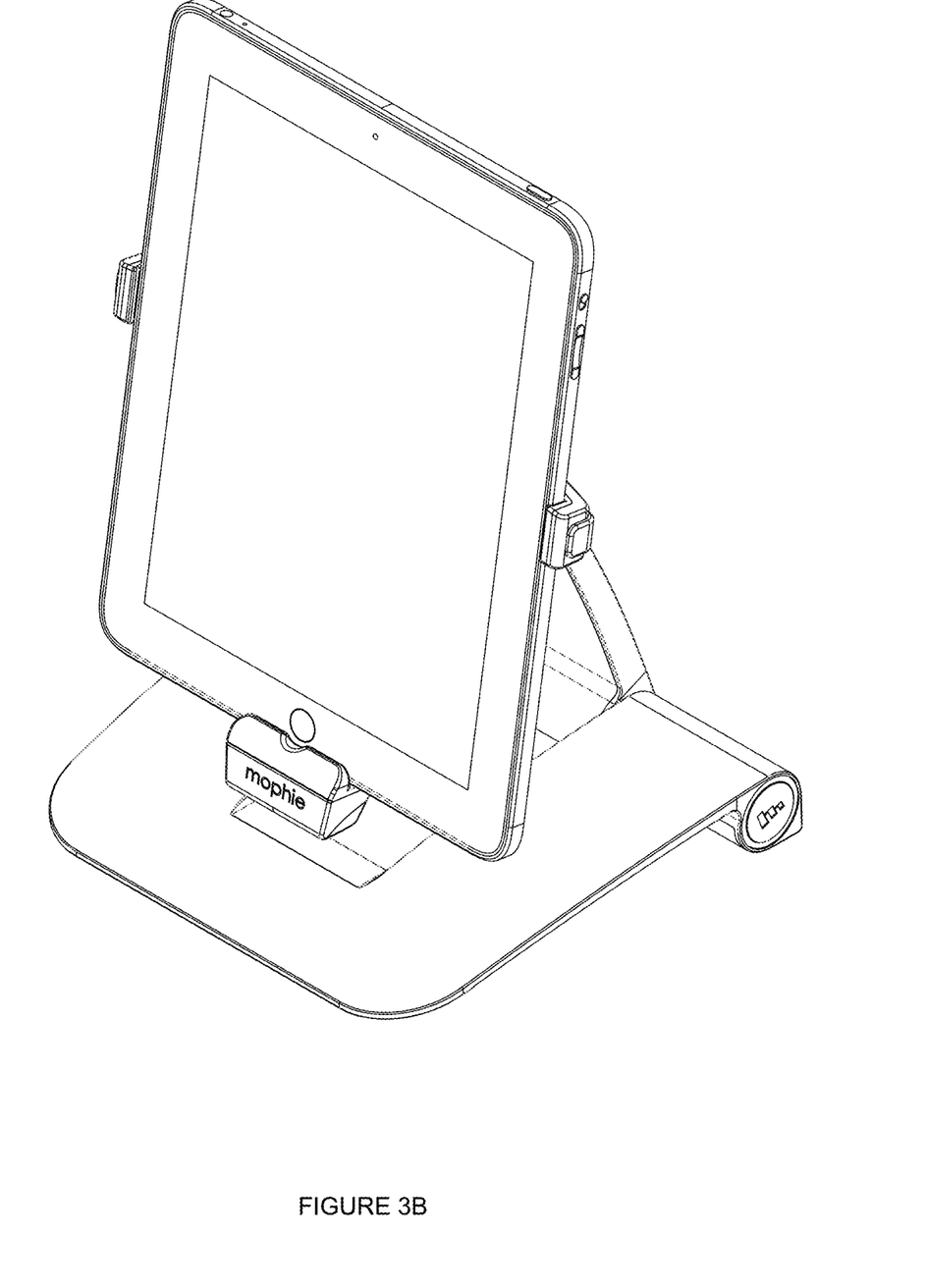
FIG. 3B illustrates an embodiment of the tablet computer stand holding the tablet computer in portrait mode.
Figure 3C:
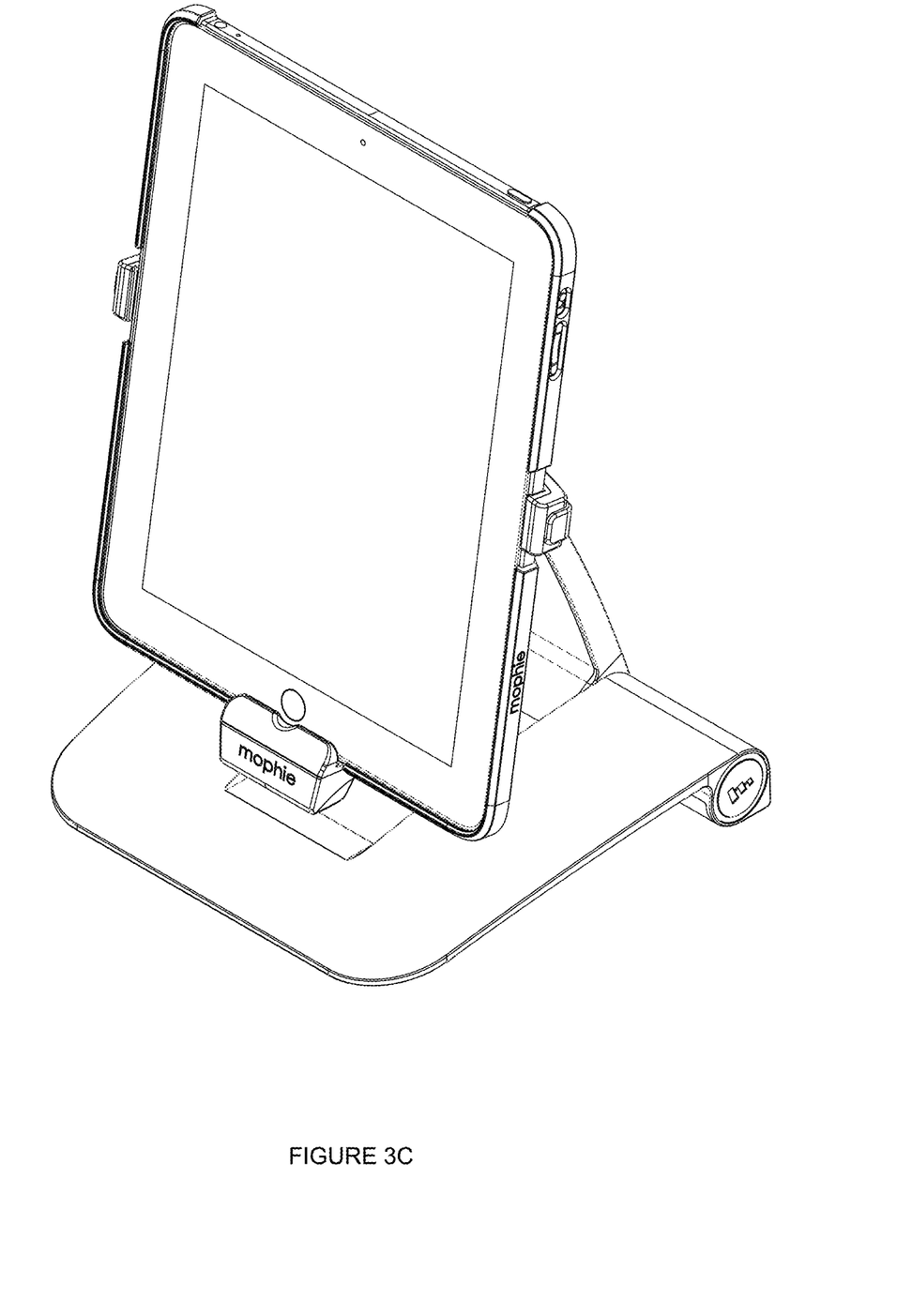
FIG. 3C illustrates an embodiment of the tablet computer stand holding the tablet computer, which is encased in the tablet computer case, in portrait mode.
Figure 4A:
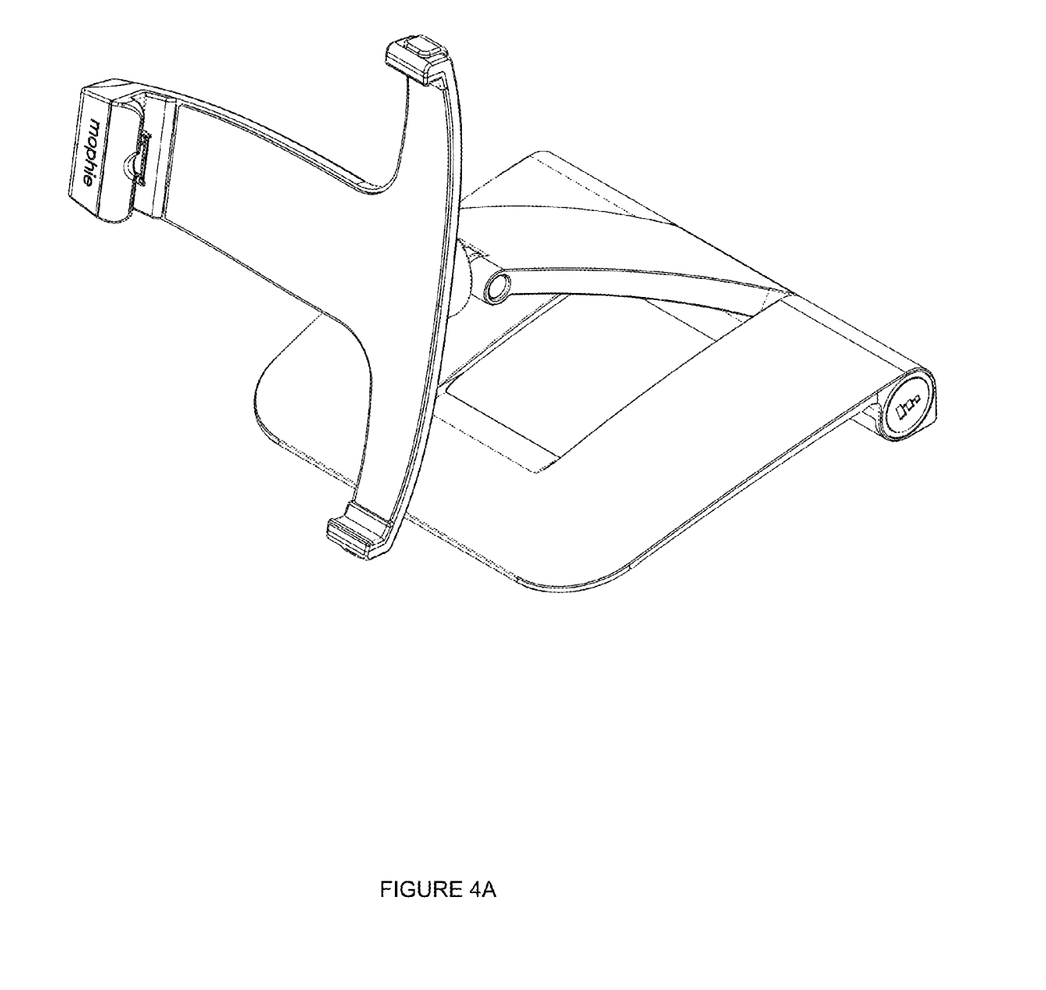
FIG. 4A illustrates an embodiment of the tablet computer stand configured to hold the tablet computer in landscape mode.
Figure 4B:
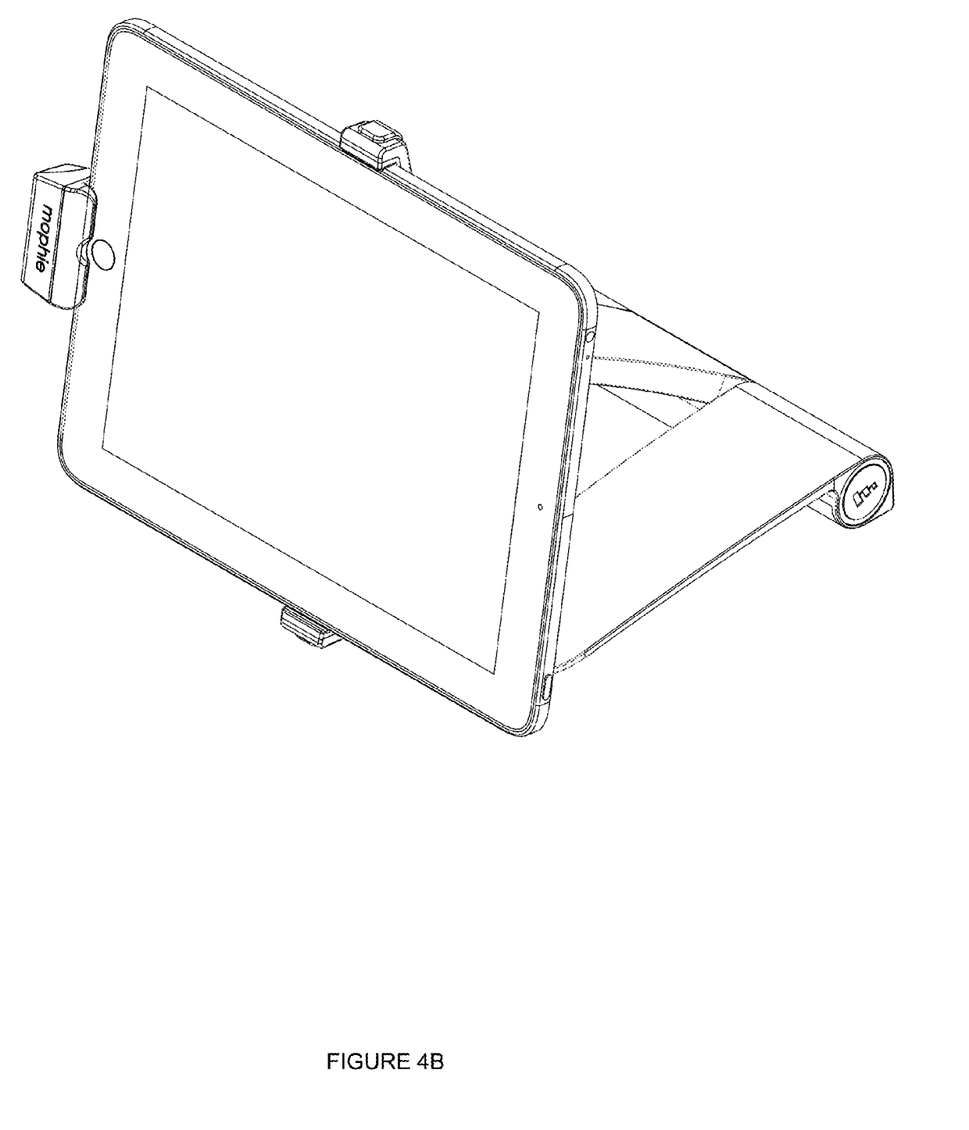
FIG. 4B illustrates an embodiment of the tablet computer stand holding the tablet computer in landscape mode.
Figure 4C:
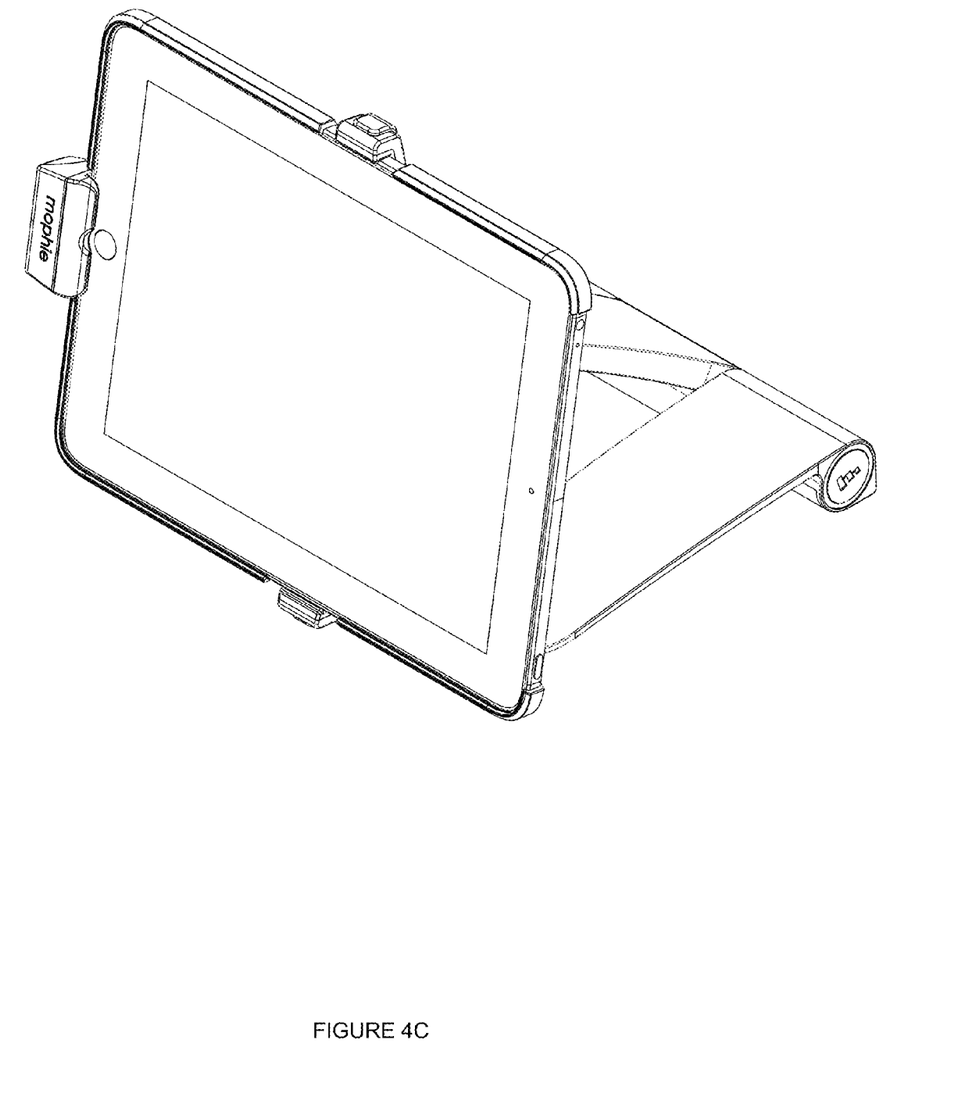
FIG. 4C illustrates an embodiment of the tablet computer stand holding the tablet computer, which is encased in the tablet computer case, in landscape mode.

As shown in FIG. 3A and FIG. 4A, the T-Arm may be rotated by the dock rotator. The dock rotator thus allows a tablet computer to be held in portrait mode (FIGS. 3A-C) or landscape mode (FIGS. 4A-C). The T-Arm may be configured to hold a tablet-sized computer, as shown in FIG. 3B and FIG. 4B or a tablet-sized computer that is enclosed in a case, as shown in FIG. 3C and FIG. 4C. In some embodiments, dock rotator enables 180 degrees rotation of the tablet and locks in either vertical or horizontal position. Dock rotator may also enable vertical tiling of the tablet computer.

The modular design of tablet computer stand may be easily adjusted to support smart tablets with different form factors. Electronic components of T-Arm allow a tablet computer to be charged while docked, assuming the tablet computer stand is connected to a power source. The same electronic components may also enable a tablet computer to synchronize with a connected personal computer. In some embodiments, electronic components may contain additional features to enable the addition of built-in sound speaker, an audio jack for connection to external speakers, and the addition of a credit card reader for commercial applications.

Figure 5A:
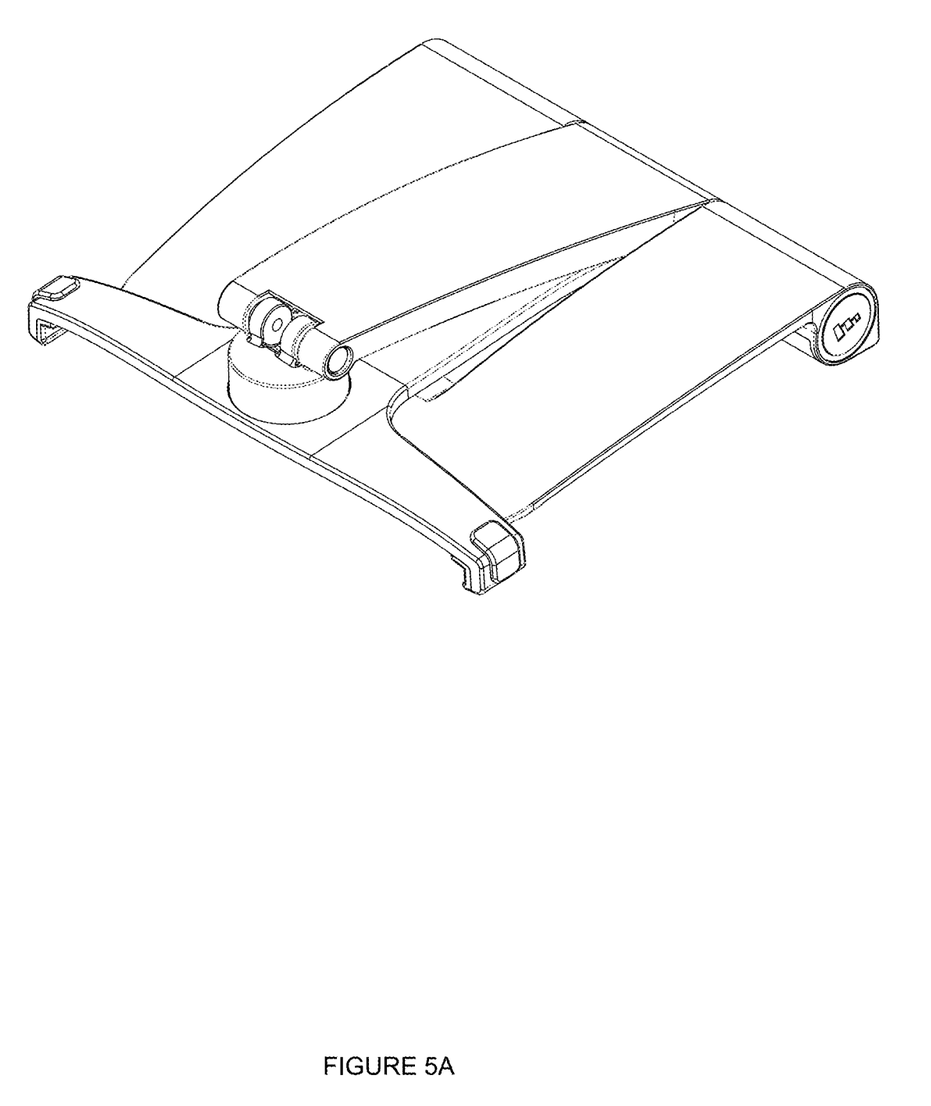
FIG. 5A shows a three-quarter view of the tablet computer stand in a folded position.
Figure 5B:
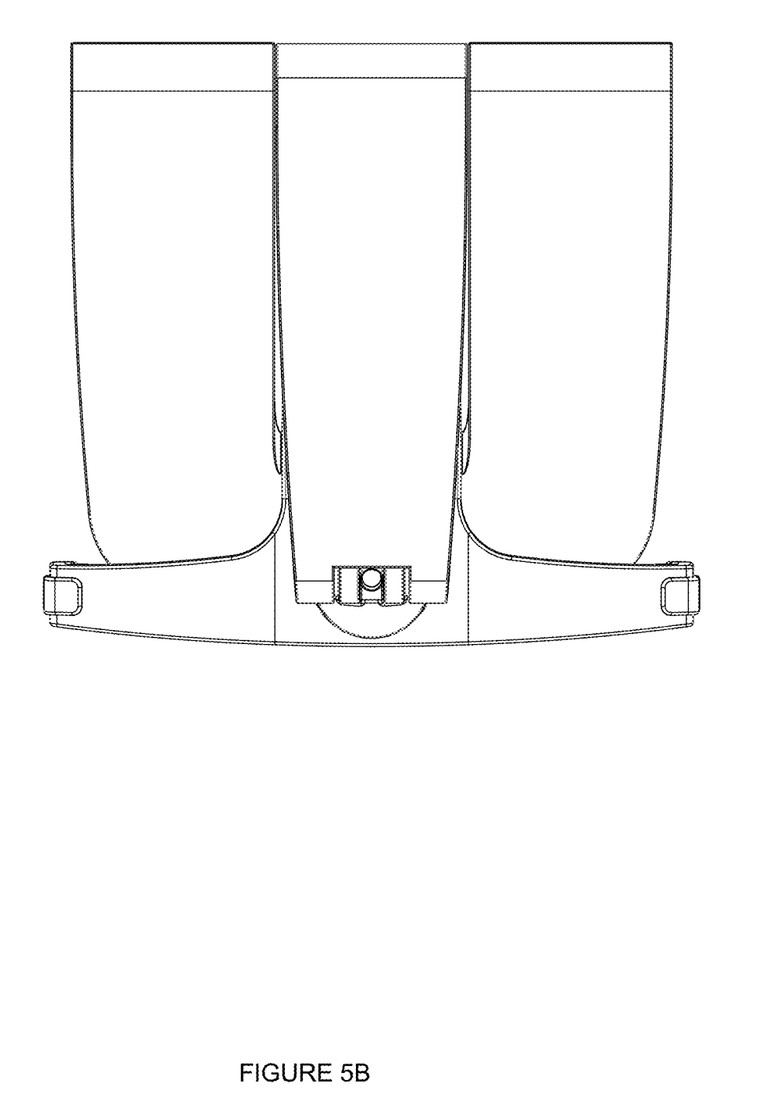
FIG. 5B shows a top view of the tablet computer stand in a folded position.

One aspect of the present invention is that the neck is coupled to the U-shaped base such that the neck folds at an almost flat position for easy storage and packaging, as shown in FIGS. 5A and 5B.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A tablet computer stand comprising:
   a T-shaped dock configured to hold a tablet computer, the T-shaped dock comprising a first support, a second support, and a third support, the tablet computer comprising a front having a touch screen of the tablet computer and a back opposite the front, the touch screen configured to accept an input, the front and back connected by lateral sides of the tablet computer, wherein the first, second, and third supports are configured to contact the tablet computer at the lateral sides of the tablet computer, away from corners of the tablet computer such that the first, second, and third supports do not contact the corners of the tablet computer, the corners formed at intersections of the lateral sides of the tablet computer, wherein the third support comprises a U-shaped grip configured to engage the tablet computer at least on the front of the tablet computer;
   a dock rotator coupled to the T-shaped dock, the T-shaped dock configured to move about the dock rotator, the dock rotator positioned such that a straight line between the first support and the second support is in a plane passing through the dock rotator, the first and second supports positioned on opposite sides of the tablet computer when the tablet computer stand holds the tablet computer, wherein the plane is perpendicular to another straight line that is perpendicular the straight line, the another straight line passing through the third support;
   a neck coupled to the dock rotator; and
   a U-shaped base coupled to the neck.

2. The tablet computer stand of claim 1, further comprising:
   a communications port within the U-shaped base.

3. The tablet computer stand of claim 2, further comprising:
   an electrical cable within the neck, coupled to the communications port.

4. The tablet computer stand of claim 3, further comprising:
   a tablet computer adapter within the third support of the T-shaped dock, coupled to the electrical cable within the neck, such that the tablet computer adapter allows for the held tablet computer to communicate with the communications port when the tablet computer stand holds the tablet computer.

5. The tablet computer stand of claim 4, wherein the tablet computer adapter is a 30-pin adapter.

6. The tablet computer stand of claim 3, wherein the electrical cable is a ribbon cable.

7. The tablet computer stand of claim 2, wherein the communications port is a Universal Serial Bus (USB) port.

8. The tablet computer stand of claim 2, wherein the communications port is a Firewire port.

9. The tablet computer stand of claim 2, wherein the communications port is a Thunderbolt port.

10. The tablet computer stand of claim 1, wherein the dock rotator is configured to move about the neck.

11. The tablet computer stand of claim 10, wherein the dock rotator is configured to pivot relative to the neck about an axis that lies on the plane passing through the dock rotator, and wherein the axis is parallel to the straight line between the first support and the second support.

12. A stand for supporting a mobile computing device, the stand comprising:
    a stand base;
    a neck connected to the stand base; and
    a dock comprising a dock arm, a first arm, and a second arm, the dock connected to the neck and rotatable relative to the neck about an axis of rotation, the dock arm extending from the axis of rotation equidistantly from the first arm and the second arm such that the dock arm is physically separate from the stand base, the neck, and the first and second arms, wherein the dock arm, the first arm, and the second arm are configured to support a mobile computing device by the dock arm, the first arm, and the second arm directly contacting the mobile computing device when the dock supports the mobile computing device, and wherein the first arm is positioned opposite the second arm relative to a center line of the dock, the center line extending along a longitudinal length of the dock arm, the center line extending along a plane passing through the dock arm, the first arm, and the second arm, and the center line passing through a center of the dock arm where the dock arm directly contacts the mobile computing device,
    wherein the first arm, the second arm, and the dock base are configured to support the mobile computing device at a first contact surface, a second contact surface, and a third contact surface, respectively, of the mobile computing device, and
    wherein the first, second, and third contact surfaces the dock arm, the first arm, and the second arm are away from corners of the mobile computing device when the stand supports the mobile computing device.

13. The stand of claim 12, wherein a longitudinal length of the first arm and a longitudinal length of the second arm are parallel to each other, and wherein the longitudinal length of the dock arm and the longitudinal lengths of the first and second arms intersect at the axis of rotation of the dock.

14. The stand of claim 13, wherein the longitudinal length of the dock arm is perpendicular to the longitudinal lengths of the first and second arms.

15. The stand of claim 13, wherein the longitudinal length of the dock arm is longer than each of the longitudinal lengths of the first and second arms.

16. The stand of claim 12, wherein the first and second arms form a side of the dock, the neck connected to the dock at the side of the dock.

17. The stand of claim 12, wherein the dock arm comprises a communication adapter configured to electrically couple with the mobile computing device.

18. A stand for supporting an electronic device, the stand comprising:
- a base comprising a top surface;
- a support connected to the base, extending above the top surface, and configured to move relative to the base; and
- a dock comprising a plurality of arms, a first surface, and a second surface opposite the first surface, the plurality of arms configured to directly contact an electronic device at end portions of the plurality of arms when the stand supports the electronic device, the plurality of arms positioned along a plane such that the plane passes through an end portion of each of the plurality of arms, the dock connected to the support by the second surface away from the end portions of the plurality of arms and configured to move relative to the support, wherein the first surface and the second surface are disposed on opposite sides of the plane,
- wherein the support and the dock are configured to move from a flat position to a support position,
- wherein, in the flat position, at least part of the first surface of the dock faces at least part of the top surface of the dock, and
- wherein, in the support position, the dock is configured to support the electronic device with the first surface of the dock facing the electronic device.

19. The stand of claim 18, wherein the base comprises an opening, and wherein in the flat position, an end portion of at least one of the plurality of arms extends into the opening.

20. The stand of claim 19, wherein the end portion of at least one of the plurality of arms extending into the opening in the flat position comprises a communication adapter configured to electrically couple with the electronic device.

21. The stand of claim 19, wherein the support extends into the opening to connect to the base, the support extending separately from the end portion of at least one of the plurality of arms extending into the opening.

22. The stand of claim 18, wherein the support is connected to the base at a periphery of the base.

23. The stand of claim 18, wherein in the flat position, at least a part of the first surface of the dock directly faces a resting surface on which the base is configured to be positioned on.

24. The stand of claim 23, wherein the base comprises an opening extending through the base, wherein in the flat position, an end portion of at least one of the plurality of arms extends into the opening with the at least a part of the first surface directly facing the resting surface through the opening.

* * * * *